Jan. 20, 1953 R. F. W. BERFORD ET AL 2,626,067
TAIL GATE FOR LOADING AND UNLOADING VEHICLES
Filed Aug. 8, 1949 6 Sheets-Sheet 1

INVENTORS
ROBERT F.W. BERFORD,
CLINTON W. WOOD,
BY
ATTORNEYS

Patented Jan. 20, 1953

2,626,067

UNITED STATES PATENT OFFICE 2,626,067

TAIL GATE FOR LOADING AND UNLOADING VEHICLES

Robert Fitz W. Berford, Dearborn, and Clinton W. Wood, Grosse Point Farms, Mich., assignors to Phil Wood Industries Limited, Windsor, Ontario, Canada, a company of Canada Application August 8, 1949, Serial No. 109,215

19 Claims. (Cl. 214—77)

1

This invention relates to apparatus, commonly known as a tailgate loader, for loading and unloading vehicles.

In apparatus of this type a platform connected to the vehicle and adapted to receive a load at ground level is raised to the height of the floor of the vehicle, while maintained substantially horizontal, and then after the load has been moved onto the vehicle, is pivoted, either manually or by power operated means, into a vertical position to form the tailgate of the vehicle. Such tailgate loaders have come into wide use because they make it possible for one man to load a vehicle with heavy crates, drums and the like at points which are not provided with fixed loading platforms level with the floor of the vehicle. The known tailgate loaders are subject to a number of disadvantages however, among the most important of which are the following:

Most of the known devices involve the use of parallel arms or links in order to hold the platform parallel to the ground as it is raised and lowered and this structure is likely to be damaged if the vehicle is unloaded with its wheels on a surface above the surface to which the tailgate will be lowered. When the platform drops below the level of the wheels, the links cross and bend or break.

A further disadvantage is the fact that since the known platforms are held substantially parallel to the ground throughout the raising and lowering by the parallel links and since the link connections at the rear edge of the platform project down from the bottom of the platform so as to hold that edge up from the ground, the outer or front edge of the platform should be provided with blocks to support it at ground level, and a small ramp should be provided which will enable heavy articles to be rolled onto the platform.

An important disadvantage of the known tailgate loaders provided with two different control levers, one for raising and lowering the platform and the other for pivoting it to the vertical position, is that there is a real danger of the wrong lever being used to stop the platform, so that it will be pivoted and the load thrown off and damaged. There is also a danger of the wrong lever being used while the platform is being raised or lowered.

Another disadvantage of most of the known tailgate loaders is that the hydraulic cylinders are directly connected to the parallel arms for raising of the platform so that all of the weight of the tailgate loader is concentrated at the rear of the vehicle and it is frequently necessary to

2 cut away parts of the vehicle chassis in order to provide for the hydraulic cylinder assembly and movement of its piston.

The objects of the present invention are to provide a tailgate loader which avoids all of the abovementioned and other disadvantages. The novel structure replaces the parallel arms with a cam and roller arrangement which not only makes it possible safely to lower the platform below the level of the ground on which the vehicle is resting but makes it possible by appropriate shaping of the cam contour to allow the outer edge of the platform to drop down onto the ground after the inner end with its projection has reached the ground so that the outer end may be provided with a knife edge permitting small hand trucks and drums to be rolled onto the platform without difficulty. The lifting arms connected to the platform are operated by a torque member which is rotated by means which permit the hydraulic cylinder assembly to be placed ahead of the rear vehicle axle while the balance of the tailgate is at the rear of the axle in the usual way, there being avoided in this way the necessity for cutting away part of the vehicle frame or in any way interfering with it. The pivoting of the platform to the vertical position is effected through a second hydraulic cylinder assembly and the two assemblies are interconnected in a novel manner through a valve means controlled by a single lever in such manner that the fluid under high pressure required to operate the second assembly to pivot the platform is obtained from the first assembly, and is so obtained only when the platform is level with the vehicle floor, and only after further movement of the hand lever.

The above, and other objects and features of the invention will appear from the following description with reference to the drawings, in which Figs. 1A and 1B form a side view of the apparatus according to the invention as applied to the vehicle shown in dotted outline, Figs. 2A and 2B form a plan view corresponding to the greater part of Fig. 1, Fig. 3 is a rear elevation of the apparatus illustrated in Figures 1 and 2, Figures 4, 4A and 4B are kinematic-line diagrams illustrating respectively the positions of the elements when the platform has been swung into the closed tailgate position, when the platform is at the level of the vehicle floor, and when the platform is resting on the ground, Fig. 5 is an enlarged detail of the quadrant with the chain connected.

Figures 1A, 2A:
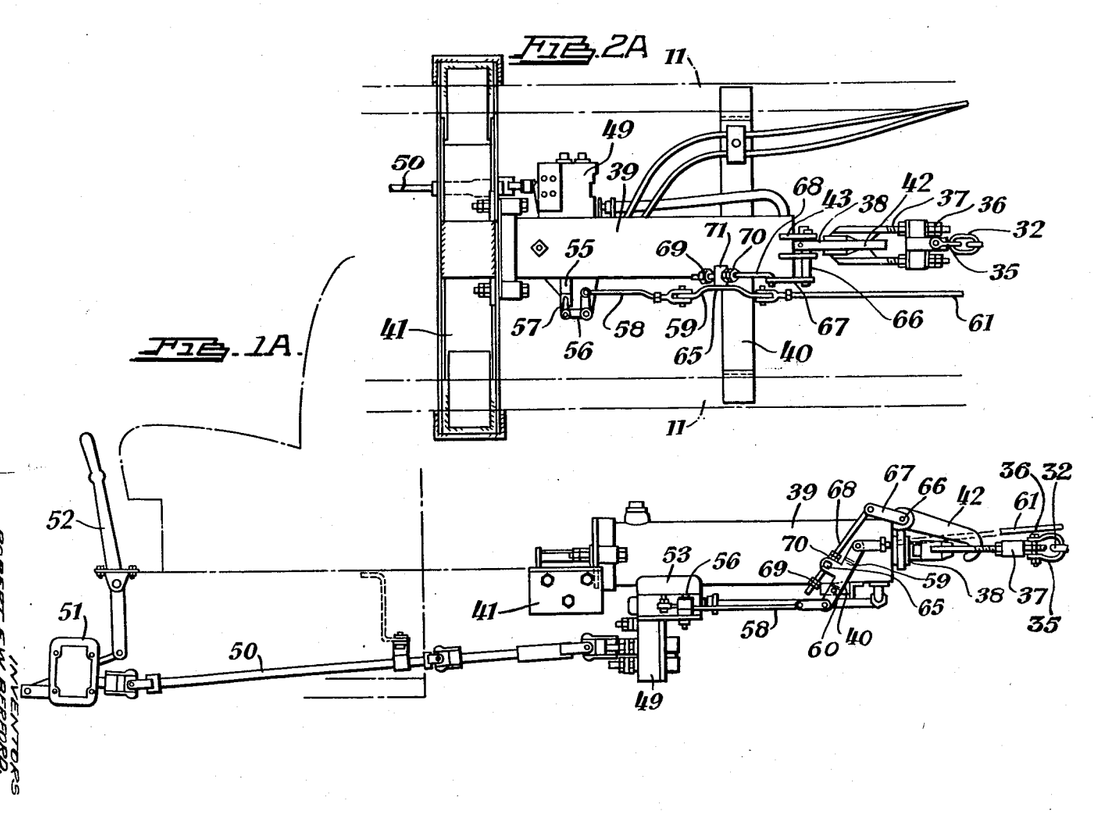
Figure 1B:
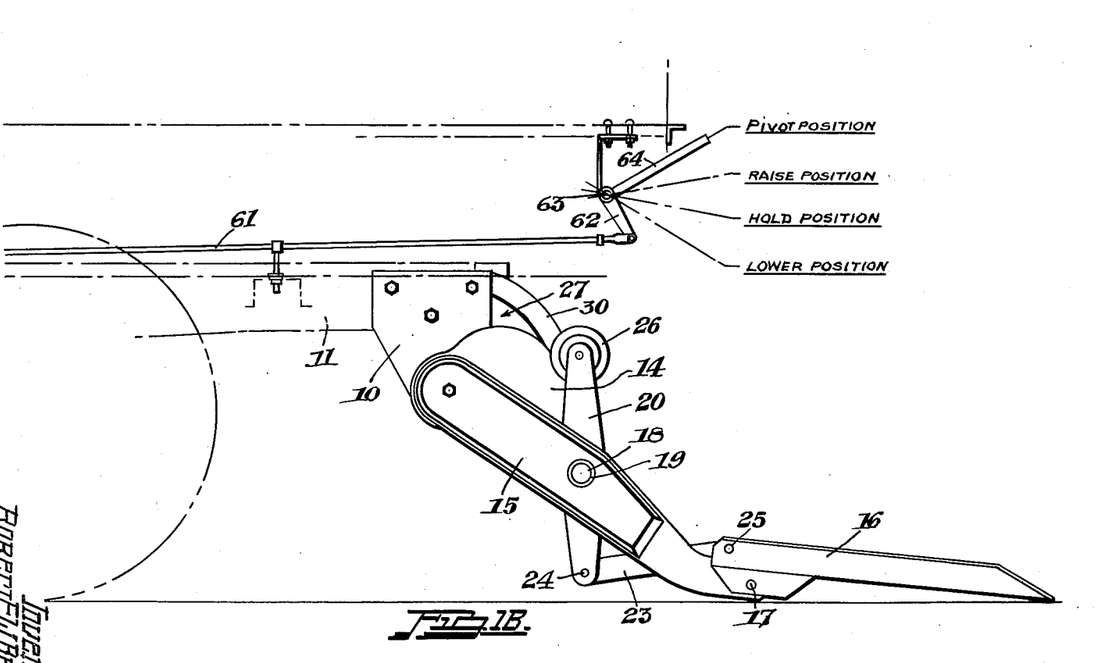
Figure 2B:
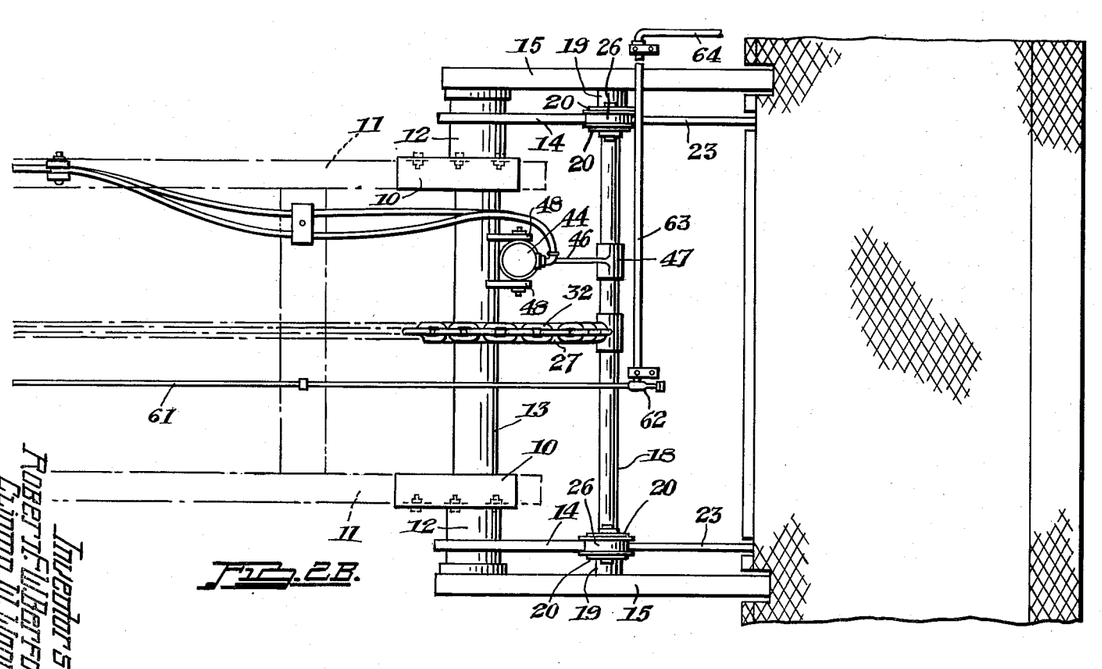

In order that the construction might be illustrated on the largest scale possible, the elevation and plan views of Figures 1 and 2 have each been divided between two portions, the left hand portion in each case being designated "A" and the right hand portion "B." The tailgate loader may be considered as comprising two groups of parts, first the tailgate itself, with its supporting and raising arms and levers, as shown in Figure 1B, and second the hydraulic system, illustrated in Figures 6-9, for actuating the tailgate.

Figure 3:
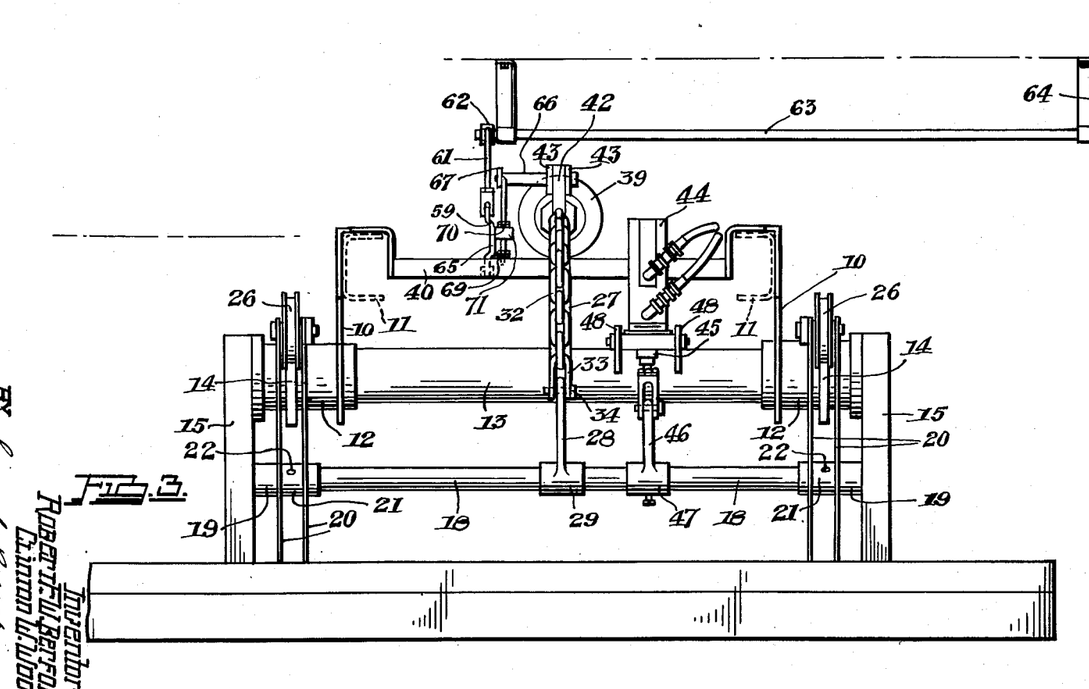

As shown in Figures 1B, 2B and 3, a flanged plate 10 is secured to each side sill of the vehicle frame near the rear end thereof so as to project downwardly therefrom. At the lower end of each plate 10 there is rigidly mounted a bearing 12 (Figures 2B and 3), and in the two bearings thus provided there is journalled a torque member which is conveniently a tube 13. Each bearing 12 carries a cam plate 14 (Figures 1B, 3, 4A and 4B) rigidly secured to the bearing for the purpose described below.

The torque tube 13 has rigidly secured thereto at each end, so as to be swung through an arc on rotation of the tube 13, a lifting arm 15 projecting rearwardly of the vehicle and pivotally connected at the end opposite the torque tube 13 to the underside of the tailgate 16 by pins 17, as illustrated in Figure 1B. Referring particularly to Figures 2B and 3 a shaft 18 is journalled in bearings 19 mounted one in each of the arms 15 midway between its ends. Adjacent each bearing 19, and aligned with a cam plate 14, there is mounted on shaft 18 a pair of levers 20 secured to hubs 21 keyed by pins 22 to shaft 18. As appears from Figure 1B, one end of each pair of levers 20 is connected to a link 23 by a pin 24 passing through the pair of levers and through the link 23, the other end of the link being pivotally connected to the tailgate by pins 25 at a point which is above pins 17 and is closer to the torque tube 13, when the tailgate is in the horizontal position illustrated in Figure 1B, than are the pins 17.

A roller 26 is mounted for rotation between the levers 20 of each pair at the end thereof opposite links 23 and the roller is adapted to cooperate with and travel over cam plate 14, which is aligned therewith, as appears from Figures 1B and 3 in such manner that as the torque tube 13 is rotated by means referred to below to swing the arms 15 upwardly, the cooperating rollers 26 and cam plates 14 hold the levers 20 so pivoted in relation to the arms 15 that the tailgate 16 is held in a substantially horizontal position. It will be seen that the weight of the tailgate tends to cause its outer end to pivot downwardly about the pins 17, thus urging the levers 20 to pivot counterclockwise, as seen in Figure 1B. Thus the weight of the tailgate forces the rollers 26 into contact with the cam plates 14, and the cam plates serve to limit and regulate the pivoting of the levers 20 under the influence of the weight of the platform.

Figures 4, 4A, 4B, 5:
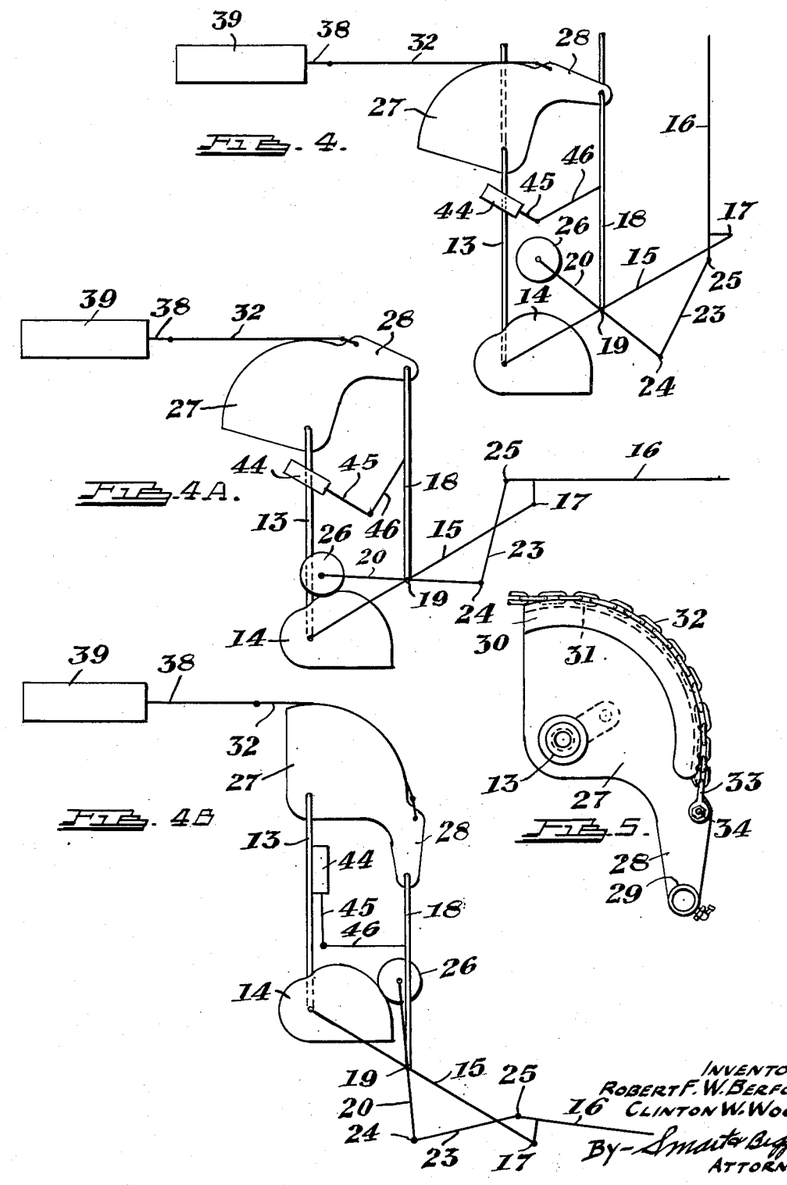

The torque tube 13 is caused to rotate, in order to lift the arms 15, by the chain and quadrant arrangement illustrated in Figure 5. The quadrant 27 is rigidly secured to the torque tube 13 so as to rotate with it, and it is provided with a tail portion 28 rigidly secured to a bearing 29 carried on shaft 18 for the purpose of supporting and strengthening shaft 18, which is subjected, when the tailgate carries a heavy load, to stresses tending to cause the shaft 18 to bow upwardly. The quadrant 27, which acts as a crank member, is provided at each side with an arcuate plate 30 so that the two plates 30 define between them a groove 31 of a width to receive every second link of a chain 32 connected to the quadrant by a clevis 33 and pin 34. As appears from Figures 1A and 2A, the chain 32 is connected at the other end by a clevis 35 and pin 36 to an adapter member 37 connected to the piston rod 38 of the main hydraulic cylinder 39, which is supported on braces 40 and 41, supported on the sills 11 of the vehicle frame. As illustrated, the adapter 37 is formed so that it may be engaged by a hook 42 pivotally mounted between lugs 43 mounted on the end of the cylinder 39, the purpose of the hook being described below.

As mentioned above, the weight of the tailgate in the horizontal position urges the rollers 26 into contact with the cam plates 14. In order to pivot the tailgate on the pins 17 into the vertical closed position illustrated in Figure 4, the shaft 18 is rotated in a clockwise direction as viewed in Figure 1B, with the effect of raising the rollers 26 from the cam plates 14 and drawing the links 23 downwardly as illustrated in Figure 4.

Shaft 18 is rotated in this way by hydraulic cylinder 44, the piston rod 45 of which is connected to a crank lever 46, preferably formed as an integral part of hub 47 which is suitably keyed to shaft 18. Referring to Figures 2B, 4 and 4A, it will be seen that as the piston rod 45 is drawn into the cylinder 44, the crank lever 46 is pulled upwardly, causing the shaft 18 to rotate clockwise. Cylinder 44 is pivotally mounted between lugs 48 formed on torque tube 13, so that it may pivot to the extent required by relative rotation of tube 13 and shaft 18 as arms 15 are raised.

Comparing Figures 4, 4A and 4B it will be seen that in Figures 4 and 4A the piston rod 38, quadrant 27 and lifting arms 15 are in the same position since the elevation of the platform has not changed but since Figure 4 shows the platform swung into the vertical closed tailgate position, the piston rod 45 which is extended in Figure 4A has been retracted in Figure 4 whereby the shaft 18 has been rotated as noted above, and the rollers 26 have been raised from the cam plates 14. In Figure 4B the piston rod 45 is in the same extended position as in Figure 4A, the cylinder 44 having been merely pivoted on lugs 48 due to the change in position of shaft 18 as the lifting arms are lowered and the shaft 18 describes an arc about the torque tube 13. However the piston rod 38 in Figure 4B is not in the same position as in Figures 4 and 4A but is extended.

Fluid under pressure is provided for the cylinders 39 and 44 by a pump 49 (Figure 1A) driven by shaft 50 from a power take-off 51 controlled by lever 52. Fluid is fed from the pump 49 to control valve 53 bolted to the pump 49 as shown in Figure 1A and illustrated in section in Figures 6–9. The control valve 53 is provided with a bore 54 and a piston or spool 55 adapted to reciprocate therein in accordance with the rocking movements of a bell crank 56, one arm of which is connected to the spool 55 by a link 57. The other arm of crank 56 is connected to a rod 58 (Figures 1A and 2A) connected to one end of a lever 59 pivoted at 60 on the brace 40. The other end of the lever 59 is connected to rod 61 which extends to the rear of the vehicle and is connected to the free end of a lever arm 62 (Figure 1B) mounted on a cross shaft 63 provided with a handle 64 as best illustrated in Figure 2B. On movement of the handle 64 to the appropriate position illustrated in Figure 1B the rods 61 and 58 are reciprocated to adjust the spool 55 of the spool valve 53 in bore 54.

The lever 59 is provided between its pivot point 60 and its connection to rod 61 with an arm 65, which is adapted, at the extremes of a range of movement of the lever 59 under the influence of the rod 61, to pivot the hook 42. The hook 42 is provided with an integral pivot pin 66 which has rigidly connected to one end thereof a lever arm 67 to the free end of which is pivoted a rod 68 threaded at the end opposite the lever arm 67 and provided with a spaced pair of locked nuts 69 and 70. Freely movable on the rod 68, between the nuts 69 and 70 is a block 71 pivotally mounted on arm 65 so that as the arm 59 is pivoted the block 71 moves between the nuts 69 and 70. When the handle 64 is moved to the "lower position" indicated in Figure 1B, the arm 59 is pivoted counterclockwise, as seen in Figure 1A, until the nut 69 is engaged by the block 71 and the hook 42 is pivoted clear of the adapter 37. As soon as the handle 64 is raised from the "lower position" the hook is no longer held up by the arm 65 and it drops onto the piston rod 38, if the same is extended, or drops into a recess provided in the adapter 37. When the handle is moved to the "pivot position" shown in Figure 1B the block 71 engages the nut 70 to ensure that the hook 42 has dropped into the recess provided in the hook 37. If the hook has merely dropped on to the piston rod, the nut 70 will prevent pivoting of the arm 59 far enough to permit sufficient movement of the rod 58 to move spool 55 to the position required to operate the hydraulic system to pivot the tailgate into the closed position. It is, therefore, impossible to pivot the tailgate into the vertical closed position until the tailgate has reached the level of the vehicle floor and the hook 42 has engaged the adapter 37.

Referring now to Figures 6–9, the control valve 53 is provided with an inlet port 72 for fluid under high pressure from the pump 49 and with outlet ports 73 and 74 connected to the low pressure side of the pump, and two connections to each of the hydraulic cylinders 39 and 44. When the spool 55 is in the position illustrated in Figure 6, high pressure fluid from inlet 72 travels through passage 75 to bore 54 and since lands 76 and 77 formed on the spool 55 prevent the fluid from reaching any other passages, the fluid passes through passage 78 to fluid line 79 to cylinder 39 behind piston 80 thereby forcing the piston 80 and its rod 38 to the right as seen in Figures 6–9, whereby the torque tube 13 is rotated by chain 32 and quadrant 27 to raise the tailgate 16. Oil is thus forced from the cylinder ahead of the piston 80 through the ports 81 and 82, the former leading through line 83 to passage 84 in communication with the portion of bore 54 above land 77, and port 82 leading to the same portion to bore 54 through lines 85 and 86. This portion of bore 54 is in communication with outlet 73 through passage 87, and outlets 73 and 74 are joined by passage 88.

Figures 6, 7, 8, 9:
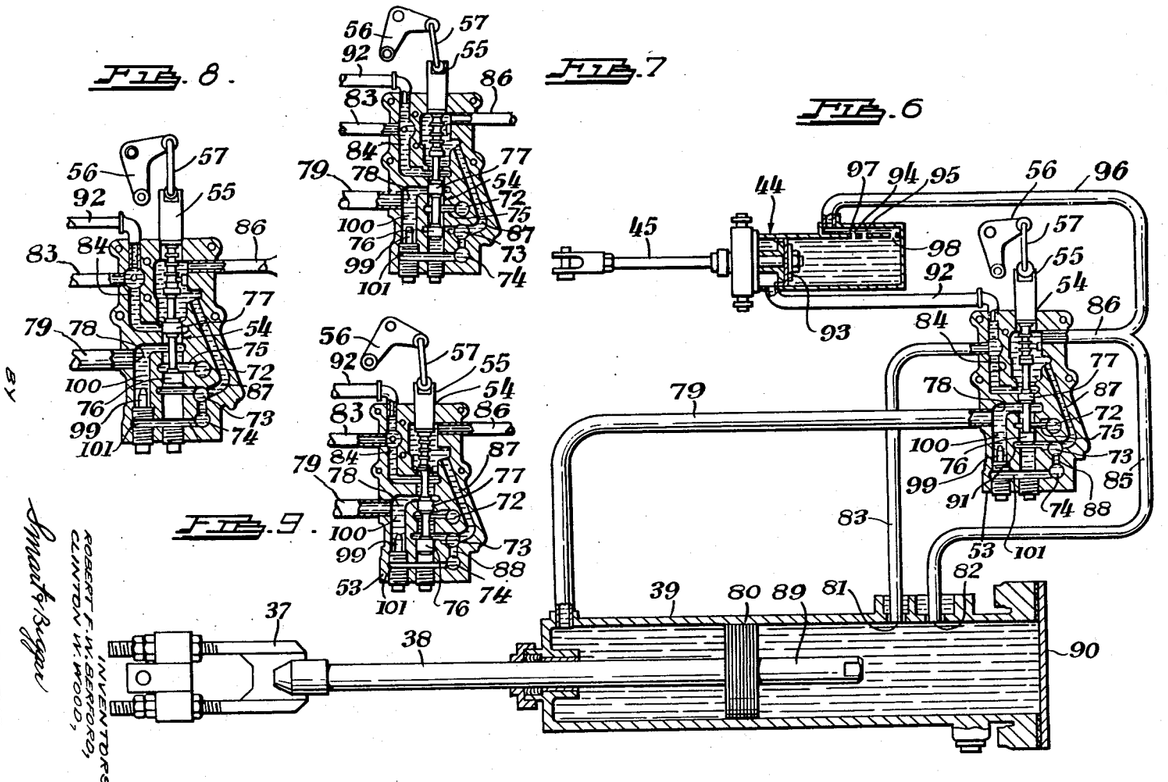
Fig. 6 is a diagram showing the position of the operating hydraulic pistons and their control valve when the valve has been moved to the position to raise the tailgate.
Fig. 7 is a diagram illustrating the position of the control valve when the tailgate is held stationary in a partly raised position.
Fig. 8 is a diagram illustrating the position of the control valve for pivoting of the tailgate into the vertical position.
Fig. 9 is a diagram illustrating the position of the control valve when the tailgate is being lowered to the ground.

When handle 64 has been moved to the "raise position" indicated in Figure 1B the spool 54 is positioned as illustrated in Figure 6 and so long as the handle 64 is left in that position the piston 80 moves to the right until piston 80 moves beyond port 81 as illustrated in Figure 8, whereupon fluid under high pressure escapes to outlets 73 and 74 through port 81. On this escape of fluid through port 81, the fluid pressure acting on piston 80 drops so that the piston 80 is not moved further toward the right. The weight of the tailgate and any load it may be carrying urges the piston 80 to the left to a position which would close the port 81, and thereby allow the pressure to the left of the piston to build up again. Thus the fluid pressure acting on the piston 80 is automatically balanced against the weight of the tailgate and its load as soon as the piston 80 has moved to the position illustrated in Figure 8. Extreme movement of the piston 80 to the right is prevented by a piston rod extension 89 engaging the end wall 90 of the cylinder 39.

It may be desired to hold the tailgate at a certain level below the vehicle floor but above ground level, and in that case the handle 64 is moved to the "hold position," which moves the spool 55 to the position indicated in Figure 7 in which land 77 blocks passage 78 so that fluid under high pressure can not pass to fluid line 79 and the fluid in cylinder 39 to the left of cylinder 80 can not escape so as to allow piston 80 to move to the left.

When the handle 64 is in the "raise position" so that the piston 80 is moved to the position illustrated in Figure 8, the pair of nuts 69 (Figure 1A) is not engaged by the arm 65 so that the hook 42 drops on to the extended piston rod 38. As the piston 80 reaches the position illustrated in Figure 8 the hook drops into the recess provided in the adapter 37 as mentioned above and thereby the pair of nuts 70 is moved clear of the position which the arm 65 must occupy when the handle 64 is moved to the extreme position required for pivoting the tailgate into the upright position. When the load has been moved on to the vehicle and the handle 64 has been moved to this "pivot" position," the spool 55 is positioned as illustrated in Figure 8 with land 76 blocking bore 54 below passage 75 and land 77 blocking passage 84 at its entrance to bore 54. Fluid under high pressure is thus forced through line 79, cylinder 39, line 83 and passage 84 to line 92, which leads to cylinder 44 behind its piston 93. Piston 93 and rod 45 are thus moved to the right so that, referring to Figures 4 and 4A, rod 45 is withdrawn into cylinder 44 and lever 46 rotates shaft 18 in a clockwise direction, thereby lifting rollers 26 from cam plates 14 as seen in Figure 4, so that the tailgate is pivoted on the pins 17. When the tailgate 16 has reached a position which is within about 20° of the vertical, its own weight and balancing will bring it into the vertical position without further action by piston rod 45 and lever 46. Accordingly ports 94 and 95 which lead to line 96 (and thus to exhaust through line 86, bore 54 above land 77 and passage 87) are so positioned as to allow the fluid under high pressure behind piston 93 to escape to exhaust after the tailgate has passed the balance point. Thus it is not "powered" during the last part of its movement, in which a man's arm might be caught between the tailgate and the vehicle side racks. While an arm so caught would be damaged by a tailgate closed under its own weight, the injury would be very much less severe than if the tailgate were "powered" at the time.

The use of the auxiliary chamber 97 makes it unnecessary to provide two exhaust lines from cylinder 44. Before ports 94 and 95 are reached by piston 93 fluid ahead of piston 93 passes through them and through port 98 into chamber 97 and thereafter, until ports 94 and 95 are uncovered, the fluid ahead of piston 93 passes only through port 98.

When the tailgate is to be lowered and the handle is moved to the "lower position" indicated in Figure 1B, the lever 59 is moved counter-clockwise as viewed in Figure 1A, so that arm 65 moves down rod 68 to engage nut 69 and lift hook 42 clear of the adapter 37. At the same time rod 58 is moved to position spool 55 as illustrated in Figure 9 in which land 77 prevents fluid under high pressure from port 72 reaching passage 78 and line 79 and clears passage 91 so that fluid under high pressure passes from port 72 through passage 75, bore 54, passage 91 and outlet 73. Because land 77 is below passage 78, fluid to the left of piston 80 in cylinder 39 is forced by the weight of the tailgate acting on piston rod 38 through line 79 to passage 78 and bore 54 and from there through passage 87 to outlets 73 and 74. At the same time lines 83, 85, 92 and 96 are all in communication with bore 54 above land 77 and thus with passage 87 and outlets 73 and 74. The tailgate thus drops under its own weight, its movement being controlled by the rate of passage of fluid from cylinder 39 to the left of piston 80. As the tailgate drops, the shaft 18 describes an arc about the torque tube 13 and the tailgate gradually approaches and passes the balance point at which it pivots under its own weight into the horizontal position. The handle 64 is then moved to the raised position so that the tailgate is lifted level with the vehicle floor and unloading of the vehicle proceeds. Alternatively the tailgate may be pivoted to the horizontal position by hand.

Referring to Figures 6–9, it will be seen that the only case in which cylinder 44 is not in free communication with exhaust on both sides of piston 93 is Figure 8 when fluid under high pressure is forced from cylinder 39 to cylinder 44 through lines 83 and 92 to pivot the tailgate into vertical position. At all other times piston 93 is free to move in cylinder 44 as a result of relative rotation of torque tube 13 and shaft 18.

It is necessary, as a practical measure, to provide a relief valve adapted to release excess pressure in passage 78 and line 79 if too great a load has been placed on the tailgate and accordingly a relief valve 99 is placed in passage 100, which is in communication with passage 78 and line 79. Passage 101 leads from relief valve 99 to port 74. It is also desirable to prevent the tailgate being pivoted to the closed vertical position before the load has been removed therefrom. Referring to Figure 8, it will be seen that too great a resistance to the movement of the piston 93 reacts on relief valve 99 through lines 92, 83 and 79 and it is adapted to release high pressure fluid to port 74 accordingly. The single relief valve can thus be used to relieve the pressure in the system if a weight over a figure, which will for example be taken as 2000 pounds, is placed on the tailgate and the handle is moved to the raised position, and also to relieve pressure if, when there is still a load of say 150 pounds on the tailgate, the handle is moved to the position to pivot the tailgate to the closed vertical position.

What we claim as our invention is:

1. Apparatus for loading and unloading vehicles, comprising, a torque member, means for mounting the torque member on a vehicle for rotation, spaced arms rigidly secured to the torque member and extending outwardly of the vehicle, a loading platform pivotally connected to said arms, means for rotating the torque member, levers pivoted between their ends on an axis substantially parallel to but spaced from the torque member, links pivotally connected at one end to one end of said levers and at the other end to the platform at points which are above the points of connection of said arms to the platform and are closer than such points to the torque member, and means adapted to cooperate with the other end of said levers to maintain the platform substantially horizontal during raising and lowering thereof.

2. Apparatus for loading and unloading vehicles, comprising, a torque member, means for mounting the torque member on a vehicle for rotation, spaced arms rigidly secured to the torque member and extending outwardly of the vehicle, a loading platform pivotally connected to said arms, means for rotating the torque member, levers pivoted between their ends on an axis substantially parallel to but spaced from the torque member, links pivotally connected at one end to one end of said levers and at the other end to the platform at points which are above the points of connection of said arms to the platform and are closer than such points to the torque member, rollers at the other end of said levers, and cam means adapted to cooperate with said rollers to maintain the platform substantially horizontal during raising and lowering thereof.

3. Apparatus for loading and unloading vehicles, comprising, a torque member, means for suspending the torque member from a vehicle for rotation about an axis extending across the length of the vehicle, spaced arms rigidly secured to the torque member and extending rearwardly of the vehicle, a loading platform pivotally connected near one edge thereof to said arms, means for rotating the torque member to raise the spaced arms and platform, levers pivoted between their ends on an axis substantially parallel to but spaced from the axis of rotation of the torque member, links pivotally connected at one end to one end of said levers and at the other end to the platform at points which are above the points of connection of said arms to the platform and are closer than such points to the torque member, rollers at the other end of said levers, and cam means adapted to cooperate with said rollers to maintain the platform substantially horizontal during raising and lowering thereof.

4. Apparatus for loading and unloading vehicles, comprising, a torque member, means for suspending the torque member from a vehicle for rotation, spaced arms rigidly secured to the torque member and extending outwardly of the vehicle, a loading platform pivotally connected near one edge thereof to said arms, means for rotating the torque member to raise said spaced arms and platform, a shaft journalled for rotation in said arms on an axis substantially parallel to but spaced from the torque member, levers rigidly mounted between their ends on said shaft, links pivotally connected at one end to one end of said levers and at the other end to the platform at points which are above the points of connection of said arms to the platform and are closer than such points to the torque member, rollers at the other end of said levers, and cam means adapted to cooperate with said rollers to maintain the platform substantially horizontal during raising and lowering thereof.

5. Apparatus for loading and unloading vehicles, comprising a torque member, means for mounting the torque member on a vehicle for rotation, spaced arms rigidly secured to the torque member and extending outwardly of the vehicle, a loading platform pivotally connected to said arms, means for rotating the torque member, levers pivoted between their ends on an axis substantially parallel to but spaced from the torque member, links pivotally connected at one end to one end of said levers and at the other end to the platform at points which are above the points of connection of said arms to the platform and are closer than such points to the torque member, rollers at the other end of said levers, cam means adapted to cooperate with said rollers to maintain the platform substantially horizontal during raising and lowering thereof, and means operable to pivot said levers in a direction to pivot the platform into a vertical position.

6. Apparatus for loading and unloading vehicles, comprising, a torque member, means for suspending the torque member from a vehicle for rotation, spaced arms rigidly secured to the torque member and extending outwardly of the vehicle, a loading platform pivotally connected near one edge thereof to said arms, means for rotating the torque member to raise said spaced arms and platform, a shaft journalled for rotation in said arms on an axis substantially parallel to but spaced from the axis of the torque member, levers rigidly mounted between their ends on said shaft, links pivotally connected at one end to one end of said levers and at the other end to the platform at points which are above the points of connection of said arms to the platform and are closer than such points to the torque member, roller means at the other end of said levers, cam means adapted to cooperate with said roller means to regulate pivoting of said levers in relation to said arms under the influence of the weight of the platform so as to maintain the platform substantially horizontal during raising and lowering thereof, and means operable, after the platform has reached a level approximately equal to that of the vehicle floor, to pivot said levers in a direction to pivot the platform into a vertical position.

7. Apparatus for loading and unloading vehicles, comprising, a torque member, means for suspending the torque member at the rear of a vehicle for rotation about an axis extending across the length of the vehicle, spaced arms rigidly secured to the torque member and extending rearwardly of the vehicle, a loading platform pivotally connected near one edge thereof to said arms, means for rotating the torque member to raise said spaced arms and platform, a shaft journalled for rotation in said arms on an axis substantially parallel to but spaced from the axis of the torque member, levers rigidly mounted between their ends on said shaft, links pivotally connected at one end to one end of said levers and at the other end to the platform at points which are above the points of connection of said arms to the platform and are closer than such points to the torque member, roller means at the other end of said levers, cam means adapted to cooperate with said roller means to regulate pivoting of said levers in relation to said arms under the influence of the weight of the platform so as to maintain the platform substantially horizontal during raising and lowering thereof, and means operable, after the platform has reached a level approximately equal to that of the vehicle floor, to pivot said levers in a direction to pivot the platform into a vertical position, said last mentioned means comprising a crank lever rigidly connected to said shaft, a hydraulic cylinder, a piston movable therein and connected to said crank lever, and means for admitting fluid under pressure to said cylinder after the platform has reached said level.

8. Apparatus for loading and unloading vehicles, comprising, a torque member, means for suspending the torque member at the rear of a vehicle for rotation about an axis extending across the length of the vehicle, spaced arms rigidly secured to the torque member and extending rearwardly of the vehicle, a loading platform pivotally connected near one edge thereof to said arms, a main hydraulic cylinder, a piston movable therein, crank means rigidly connected to the torque member and connected to said piston for rotating the torque member to raise said spaced arms and platform, means for admitting fluid under pressure to said cylinder, a shaft journalled for rotation in said arms on an axis substantially parallel to but spaced from the axis of the torque member, levers rigidly mounted between their ends on said shaft, links pivotally connected at one end to one end of said levers and at the other end to the platform at points which are above the points of connection of said arms to the platform and are closer than such points to the torque member, roller means at the other end of said levers, cam means adapted to cooperate with said roller means to maintain the platform substantially horizontal during raising and lowering thereof, and means operable, after the platform has reached a level approximately equal to that of the vehicle floor, to rotate said shaft to pivot said levers in a direction to pivot the platform into a vertical position, said last mentioned means comprising a crank lever rigidly connected to said shaft, a second hydraulic cylinder, a piston movable therein and connected to said crank lever, and means for diverting fluid under pressure from said main cylinder to said second cylinder to act on the piston movable therein after the platform has reached said level.

9. Apparatus as defined in claim 8, in which said main cylinder is provided with an outlet adapted to be opened by the piston movable therein when the platform reaches said level, and means is provided operable to pass the fluid under pressure acting on said piston from said outlet to the second cylinder.

10. Apparatus as defined in claim 9 in which said means for passing fluid to the second cylinder comprises a multi-way valve, a fluid line connecting the valve to the inlet of the main cylinder, a fluid line connecting said outlet of the main cylinder to the valve, a fluid line connecting the valve to the inlet of the second cylinder, said valve having at least two operating positions in one of which fluid under pressure is fed to the inlet of the main cylinder, and any fluid reaching the valve from the line connecting said outlet and the valve is passed to exhaust, whereas in a second operating position fluid under pressure is fed to the inlet of the main cylinder but fluid reaching the valve from said outlet is passed to the inlet of the second cylinder, and an operating lever adapted to place said valve in a selected one of said positions.

11. Apparatus as defined in claim 10, comprising means adapted to prevent movement of said operating lever to place the valve in the second mentioned position until said outlet has been opened to the fluid acting on the piston movable in the main cylinder.

12. In vehicle loading and unloading apparatus comprising, a loading platform, means for raising the platform from ground level to the level of the vehicle floor and means for pivoting the platform into the vertical position to serve as a tailgate; a main hydraulic cylinder, a piston movable therein and connected to actuate said means for raising the platform, a second hydraulic cylinder, a piston movable therein and connected to actuate said means for pivoting the platform into the vertical position, means for admitting fluid under pressure to said main cylinder to move its piston to raise the platform, means adapted, when the platform reaches a level approximately equal to that of the vehicle floor to divert fluid under pressure from the main cylinder automatically to balance the fluid pressure acting on the piston thereof against the weight of the platform and its load acting on said piston, and means for passing said diverted fluid to said second hydraulic cylinder to pivot the platform into the vertical position.

13. In vehicle loading and unloading apparatus comprising, a loading platform, means for raising the platform from ground level to the level of the vehicle floor and means for pivoting the platform into the vertical position to serve as a tailgate; a main hydraulic cylinder, a piston movable therein and connected to actuate said means for raising the platform, a second hydraulic cylinder, a piston movable therein and connected to actuate said means for pivoting the platform into the vertical position, means for admitting fluid under pressure to the main cylinder to move its piston to raise the platform, at least one port in said main cylinder adapted to be opened by the piston movable therein to the fluid under pressure acting on said piston when the platform has reached a level approximately equal to that of the vehicle floor, and means for passing fluid from said port to exhaust or to said second cylinder to pivot the platform into the vertical position.

14. In vehicle loading and unloading apparatus comprising, a loading platform, means for raising the platform from ground level to the level of the vehicle floor and means for pivoting the platform into the vertical position to serve as a tailgate; a main hydraulic cylinder, a piston movable therein and connected to actuate said means for raising the platform, a second hydraulic cylinder, a piston movable therein and connected to actuate said means for pivoting the platform into the vertical position, each of said cylinders having an inlet for fluid under pressure and, spaced therefrom, an outlet adapted to be opened by the piston movable in such cylinder to the fluid under pressure acting on such piston, the outlet of the main cylinder being positioned so that it is opened when the platform has reached a level approximately equal to that of the vehicle floor, and means operable to pass fluid under pressure from said outlet to the inlet of the second cylinder after said outlet has been opened to the fluid acting on the piston movable in the main cylinder.

15. In vehicle loading and unloading apparatus comprising, a loading platform, means for raising the platform from ground level to the level of the vehicle floor and means for pivoting the platform into the vertical position to serve as a tailgate; a main hydraulic cylinder, a piston movable therein and connected to actuate said means for raising the platform, a second hydraulic cylinder, a piston movable therein and connected to actuate said means for pivoting the platform into the vertical position, each of said cylinders having an inlet for fluid under pressure and, spaced therefrom, an outlet adapted to be opened by the piston movable in such cylinder to the fluid under pressure acting on such piston, the outlet of the main cylinder being positioned so that it is opened when the platform has reached a level approximately equal to that of the vehicle floor, and the outlet of the second cylinder being positioned so that it is opened after the platform has passed its balance point but before it has reached the vertical position, and means operable to pass fluid under pressure from said outlet to the inlet of the second cylinder after said outlet has been opened to the fluid acting on the piston movable in the main cylinder.

16. Apparatus as defined in claim 15, in which said means operable to pass fluid under pressure from said outlet of the main cylinder to the inlet of the second cylinder comprises, a multi-way valve, a fluid line connecting the valve to the inlet of the main hydraulic cylinder, a fluid line connecting said outlet to the valve, a fluid line connecting the valve to the inlet of the second hydraulic cylinder, said valve having at least two operating positions in one of which fluid under pressure is fed to the inlet of the main hydraulic cylinder, and any fluid reaching the valve from the line connecting said outlet and the valve is passed to exhaust, whereas in a second operating position fluid under pressure is fed to the inlet of the main hydraulic cylinder but fluid reaching the valve from said outlet is passed to the inlet of the second hydraulic cylinder, and an operating lever adapted to place said valve in a selected one of said positions.

17. Apparatus as defined in claim 16, comprising means adapted to prevent movement of said operating lever to place the valve in the second mentioned position until said outlet has been opened to the fluid acting on the piston movable in the main hydraulic cylinder.

18. Apparatus as defined in claim 16, in which said multi-way valve is adapted in another operating position controlled by the same operating lever to open the line connecting the valve and the inlet of the main hydraulic cylinder to exhaust, and to permit fluid to enter the main cylinder on the side of its piston opposite its inlet, whereby the platform is allowed to settle to the ground under its own weight.

19. Apparatus as defined in claim 18, in which said multi-way valve is adapted in still another operating position controlled by the same operating lever to close off the line between the valve and the main cylinder inlet against fluid flow in either direction whereby the platform is held stationary.

ROBERT FITZ WM. BERFORD.
CLINTON W. WOOD.

(References on following page)

REFERENCES CITED

The following references are of record in the file of this patent:

UNITED STATES PATENTS

| Number | Name | Date |
|---|---|---|
| 1,620,256 | Heise | Mar. 8, 1927 |
| 1,733,988 | Barnard | Oct. 29, 1929 |
| 2,348,993 | Novotney | May 16, 1944 |
| 2,353,655 | Day | July 18, 1944 |
| 2,390,268 | Penney | Dec. 4, 1945 |
| 2,456,805 | Wohlforth | Dec. 21, 1948 |
| 2,469,321 | Wood | May 3, 1949 |
| 2,478,055 | Redington | Aug. 2, 1949 |